(12) United States Patent
Boye (10) Patent No.: US 10,189,557 B2
(45) Date of Patent: Jan. 29, 2019

(54) PASSENGER AIRCRAFT WITH A DOWNWARDLY FOLDABLE WING TIP DEVICE

(71) Applicant: AIRBUS OPERATIONS LIMTED, Bristol (GB)

(72) Inventor: Sylvain Boye, Bristol (GB)

(73) Assignee: Airbus Operations Limited, Bristol (GB)

( * ) Notice: Subject to any disclaimer, the term of this patent is extended or adjusted under 35 U.S.C. 154(b) by 287 days.

(21) Appl. No.: 15/301,858

(22) PCT Filed: Apr. 2, 2015

(86) PCT No.: PCT/GB2015/051031
§ 371 (c)(1),
(2) Date: Oct. 4, 2016

(87) PCT Pub. No.: WO2015/150816
PCT Pub. Date: Oct. 8, 2015

(65) Prior Publication Data
US 2017/0113780 A1    Apr. 27, 2017

(30) Foreign Application Priority Data
Apr. 4, 2014    (GB) .................................... 1406099.0

(51) Int. Cl.
*B64C 3/56*    (2006.01)
*B64C 23/06*   (2006.01)

(52) U.S. Cl.
CPC .............. *B64C 3/56* (2013.01); *B64C 23/072* (2017.05); *Y02T 50/14* (2013.01)

(58) Field of Classification Search
CPC ......... B64C 3/546; B64C 3/56; B64C 23/072; B64C 23/076
See application file for complete search history.

(56) References Cited

U.S. PATENT DOCUMENTS

| 1,457,222 A | 5/1923 | Frey |
| 1,731,757 A | 10/1929 | Tubbe |

(Continued)

FOREIGN PATENT DOCUMENTS

| DE | 35 08 103 | 9/1986 |
| DE | 20 2004 014 384 | 11/2004 |

(Continued)

OTHER PUBLICATIONS

International Search Report and Written Opinion of the ISA for PCT/GB2015/051031, dated Jun. 9, 2015, 13 pages.
Search Report for GB 1406099.0 dated 9 Oct. 9, 2014, 1 page.

*Primary Examiner* — Joseph W Sanderson
(74) *Attorney, Agent, or Firm* — Nixon & Vanderhye P.C.

(57) ABSTRACT

A passenger aircraft including a wing (1) and a wing tip device (3). The wing tip device (3) is moveable between a flight configuration for use during flight and a ground configuration for use during ground-based operations. In the ground configuration the wing tip device is folded downwardly from the flight configuration such that the span of the aircraft is reduced. The wing tip device (3) is connected to the wing along a hinge (9) defining a hinge line (11). The hinge (9) may be arranged to prevent the wing tip device (3) rotating upwardly beyond the flight configuration. The hinge line (11) may be orientated at an angle to the flight direction such that the wing tip device (3) presents a larger frontal area when it is in the ground configuration than when it is in the flight configuration, such that aerodynamic forces urge it to rotate about the hinge line (11) away from the ground configuration and towards the flight configuration.

18 Claims, 4 Drawing Sheets

(56) References Cited

U.S. PATENT DOCUMENTS

| | | | |
|---|---|---|---|
| 1,819,794 A | | 8/1931 | Schultze |
| 2,881,989 A | * | 4/1959 | Flettner .................. B64C 27/26 244/49 |
| 4,722,499 A | | 2/1988 | Klug |
| 5,072,894 A | | 12/1991 | Cichy |
| 5,988,563 A | | 11/1999 | Allen |
| 6,345,790 B1 | | 2/2002 | Brix |
| 6,827,314 B2 | | 12/2004 | Barriety |
| 7,137,589 B2 | * | 11/2006 | Arata ...................... B64C 27/26 244/6 |
| 9,469,391 B1 | * | 10/2016 | Dong ....................... B64C 3/385 |
| 9,714,080 B2 | * | 7/2017 | Bradshaw ............. B64C 23/076 |
| 2004/0000619 A1 | * | 1/2004 | Barriety ................... B64C 3/52 244/219 |
| 2007/0262207 A1 | * | 11/2007 | Morgenstern ............. B64C 3/16 244/214 |
| 2009/0224107 A1 | * | 9/2009 | McLean .................... B64F 5/00 244/199.4 |
| 2010/0051742 A1 | | 3/2010 | Schweighart et al. |
| 2013/0099060 A1 | | 4/2013 | Dees et al. |
| 2015/0360765 A1 | * | 12/2015 | Bradshaw ............. B64C 23/076 244/45 R |
| 2017/0029089 A1 | * | 2/2017 | Alexander ................ B64C 3/40 |
| 2017/0043864 A1 | * | 2/2017 | Axford .................. B64C 3/185 |

FOREIGN PATENT DOCUMENTS

| | | |
|---|---|---|
| EP | 2727826 | 5/2014 |
| GB | 299212 | 10/1928 |
| JP | 2011-225058 | 11/2011 |

* cited by examiner

PASSENGER AIRCRAFT WITH A DOWNWARDLY FOLDABLE WING TIP DEVICE

RELATED APPLICATIONS

This application is the U.S. national phase of International Application PCT/GB2015/051031 filed Apr. 2, 2015, which designated the U.S. and claims priority to Great Britain Patent Application GB 1406099.0 filed Apr. 4, 2014, the entire contents of the applications are incorporated by reference.

BACKGROUND OF THE INVENTION

The present invention relates to passenger aircraft and more specifically to passenger aircraft with wing tip devices, and to methods of operating such aircraft.

There is a trend towards increasingly large passenger aircraft, for which it is desirable to have correspondingly large wing spans. However, the maximum aircraft span is effectively limited by airport operating rules which govern various clearances required when manoeuvring around the airport (such as the span and/or ground clearance required for gate entry and safe taxiway usage).

In some suggested designs, aircraft are provided with wings which may be folded upwardly to reduce the span of the aircraft on the ground (compared to when the aircraft is configured for flight). However, a disadvantage with such arrangements is that they tend to require heavy actuators and/or locking mechanisms to deploy the wing and to securely hold it in the flight configuration.

Another disadvantage in upwardly folding wings is that the aerodynamic lift forces on the wing during use, tend to be urging the wing towards the folded position. Thus, in the theoretical event of an equipment failure (for example an actuator or lock failure) the wing may be liable to fold upwards. Even if safety systems are in place to prevent this, there may at least be an adverse passenger perception of such a possibility occurring.

The present invention seeks to mitigate at least some of the above-mentioned problems.

SUMMARY OF THE INVENTION

According to a first aspect of the invention, there is provided a passenger aircraft comprising a wing, the wing having a wing tip device at the tip thereof, wherein the wing tip device is moveable between: (i) a flight configuration for use during flight, and (ii) a ground configuration for use during ground-based operations, in which ground configuration the wing tip device is folded downwardly from the flight configuration such that the span of the aircraft is reduced, and wherein the wing tip device is connected to the wing along a hinge defining a hinge line, the hinge being arranged to allow the wing tip device to rotate about the hinge line between the flight configuration and the ground configuration, but to prevent the wing tip device rotating upwardly beyond the flight configuration.

By providing an arrangement in which the wing tip device is configurable between the flight and the ground configurations, the aircraft is able to take advantage of having a large span during flight, whilst being able to adhere to airport span limits during ground operations. In addition, by providing an arrangement in which the hinge prevents the wing tip device rotating upwardly beyond the flight configuration, the required capacity of any actuator and/or locking mechanism that accompanies the device may be reduced. This in turn, may lead to weight savings.

With the wing tip device in the flight configuration, the aerodynamic forces acting on the wing tip device may be such that the wing tip device urged away from rotating back into the ground configuration. Such an arrangement is especially beneficially because it ensures that the forces exerted on the wing tip device during flight are urging it towards a stable configuration (i.e. the flight configuration beyond which the wing tip device cannot rotate), rather than into an unstable condition (as should be the case if the wing tip device were able to rotate upwardly to a folded configuration).

The wing and the wing tip device may comprise respective abutment surfaces. The hinge may be configured such that in the flight configuration, the abutment surfaces of the wing tip device and the wing abut one another thereby blocking further rotation of the wing tip device upwardly beyond the flight configuration. Such an arrangement is a relatively simple way of preventing movement. Furthermore, it enables efficient load transfer from the wing tip device to the wing. During flight, with the wing tip device in the flight configuration, the bending moment generated about the hinge line is preferably reacted against the abutment surface of the wing. Thus, the bending moment is preferably not taken by an actuator or locking mechanism but is instead taken by the primary wing structure, for example.

The aircraft may comprise a lock for locking the wing tip device when it is in the flight configuration. The lock is preferably arranged to prevent rotation of the wing tip device from the flight configuration to the ground configuration. Since the wing tip device is downwardly foldable, such a rotation would only be urged during a negative-g flight condition. The lock may be rated to prevent the rotation of the wing tip device over the negative-g flight envelope. Since negative-g flight conditions tend not to be as severe as positive-g conditions, the lock may be of relatively low rating (i.e. locking strength). Thus whilst the majority of the aircraft may be designed for experiencing greater magnitude positive-g loadings than negative-g loadings, the lock may be rated for positive-g flight conditions, to no more than the magnitude of the rating in negative-g conditions. The lock may be arranged to be substantially free from loads during positive-g flight.

During forwards motion of the aircraft, with the wing tip device in the ground configuration, the aerodynamic forces acting on the wing tip device may be such that the wing tip device is allowed to rotate, and preferably rotates, about the hinge line away from the ground configuration and towards the flight configuration. Such an arrangement is beneficial because it reduces the required capacity of an actuator to move the wing tip device from the ground configuration to the flight configuration. In some embodiments it may reduce the need for an actuator all together. Removing the need for the actuator entirely is attractive because it simplifies the arrangement and may reduce maintenance costs.

The above-mentioned function of urging the wing tip device away from the ground configuration may be achieved solely by the aerodynamic design of the wing (for example the orientation/shape of lifting surfaces). In preferred embodiments, however, the hinge line is orientated at an angle to the flight direction such that the wing tip device presents a larger frontal area when it is in the ground configuration than when it is in the flight configuration. During forwards motion of the aircraft, the aerodynamic forces, preferably the pressure drag, may therefore act on the wing tip device move it away from the ground configuration and towards the flight configuration. In some embodiments, these same aerodynamic forces may move the wing tip device all the way into the flight configuration. In preferred embodiments, the wing tip device may be arranged to generate different aerodynamic forces (such as lift) that become predominant as the wing tip device moves towards the flight condition, and these different aerodynamic forces may move, or contribute to moving, the wing tip device into the flight configuration.

The wing may comprise a multiplicity of wing ribs. The hinge line is preferably orientated parallel to the wing ribs. The hinge may be located substantially within the plane of one of the wing ribs (for example directly above a rib). The hinge may be arranged such that the loads from the wing tip device (for example the bending moment about the hinge line) may be transferred directly into the wing rib. In embodiments in which the wing comprises an abutment surface, the forces on the abutment surface may be transferred directly into the rib. The forces may, of course, also be transferred to the spars from the ribs. The wing is preferably swept. The wing preferably comprises a spar. The ribs preferably extend substantially perpendicular to the spar. The ribs are therefore preferably at an angle to the direction of flight.

According to another aspect of the invention, there is provided a passenger aircraft comprising a wing, the wing having a wing tip device at the tip thereof, wherein the wing tip device is moveable between: (i) a flight configuration for use during flight, and (ii) a ground configuration for use during ground-based operations, in which the wing tip device is folded downwardly from the flight configuration such that the span of the aircraft is reduced, and wherein the wing tip device is connected to the wing along a hinge defining a hinge line, the hinge being arranged to allow the wing tip device to rotate about the hinge line between the flight configuration and the ground configuration, and the hinge line being orientated at an angle to the flight direction such that the wing tip device presents a larger frontal area when it is in the ground configuration than when it is in the flight configuration, and such that during forwards motion of the aircraft, the aerodynamic forces act on the wing tip device to allow it to rotate about the hinge line away from the ground configuration and towards the flight configuration under the action of such forces.

Such an arrangement is beneficial because it reduces the required capacity of an actuator to move the wing tip device from the ground configuration to the flight configuration. In some embodiments it may even reduce the need for an actuator all together.

The aircraft may comprises an actuator for moving the wing tip device from the ground configuration to the flight configuration. The actuator preferably has a capacity of less than that required to move the wing tip device in the absence of the aerodynamic forces. The actuator may be arranged to assist, but to not solely enable, movement of the wing tip device to the flight configuration.

The aircraft is preferably a passenger aircraft. The passenger aircraft preferably comprises a passenger cabin comprising a plurality of rows and columns of seat units for accommodating a multiplicity of passengers. The aircraft may have a capacity of at least 20, more preferably at least 50 passengers, and more preferably more than 50 passengers. The aircraft is preferably a powered aircraft. The aircraft preferably comprises an engine for propelling the aircraft. The aircraft may comprise wing-mounted, and preferably underwing, engines.

The wing tip device may take a number of forms. The wing tip device may be a wing tip extension; for example the wing tip device may be a planar tip extension. In other embodiments, the wing tip device may comprise, or consist of, a non-planar device, such as a winglet. Embodiments of the invention may be especially beneficial when used with wing tip extensions because the change in span between the two configurations tends to be most pronounced. The planar wing extension is also especially beneficial in embodiments of the invention in which the hinge line is orientated at an angle to the flight direction, because such a wing extension may present an especially large frontal area when it is in the ground configuration. The wing tip device may be a downwardly extending winglet (in the flight configuration). Such an arrangement may be beneficial for use with the invention because a relatively small angular rotation of the winglet would be required in order to reduce the span (compared to an upwardly extending winglet for example).

In the flight configuration the trailing edge of the wing tip device is preferably a continuation of the trailing edge of the wing. The leading edge of the wing tip device is preferably a continuation of the leading edge of the wing, such that there is a smooth transition from the wing to the wing tip device. It will be appreciated that there may be a smooth transition, even where there are changes in sweep or twist at the wing/wing tip device junction. However, there are preferably no discontinuities at the junction between the wing and wing tip device. At least at the root of the wing tip device, and preferably along the length of the wing tip device, the upper and the lower surfaces of the wing tip device may be continuations of the upper and lower surfaces of the wing.

The planar wing extension is also attractive because it may be allowed to freely hang in the ground configuration (the span necessarily having been reduced when so hanging). In embodiments in which the wing tip device is non-planar, it may be necessary for the wing tip device to be rotated beyond the vertical in the ground configuration to ensure the span is reduced. In such embodiments, the aircraft may comprise a locking mechanism for holding the device in the ground configuration.

The wing tip device preferably does not comprise any control surfaces. Having such a wing tip device is beneficial because it does not require any infrastructure for operating the control surface (which may otherwise be unduly complicated since the wing tip device rotates about the hinge line).

When the wing tip device is in the ground configuration, the aircraft incorporating the wing, may be unsuitable for flight. For example, the wing tip device may be aerodynamically and/or structurally unsuitable for flight in the ground configuration. The aircraft is preferably configured such that, during flight, the wing tip device is not moveable to the ground configuration. The aircraft may comprise a sensor for sensing when the aircraft is in flight. When the sensor senses that the aircraft is in flight, a control system is preferably arranged to disable the possibility of moving the wing tip device to the ground configuration.

According to another aspect of the invention, there is provided a method of operating an aircraft having a wing and a wing tip device on the tip of the wing, the method comprising the steps of: (i) having the wing tip device in a flight configuration during flight, and (ii) having the wing tip device in a ground configuration when the aircraft is on the ground, in which ground configuration the wing tip device is folded downwardly from the flight configuration such that the span of the aircraft is reduced, wherein the wing tip device is connected to the wing along a hinge defining a hinge line, the hinge being arranged to allow the wing tip device to rotate about the hinge line between the flight configuration and the ground configuration, but to prevent the wing tip device rotating upwardly beyond the flight configuration.

According to another aspect of the invention, there is provided a method of operating an aircraft as described herein, the method comprising the steps of: (i) having the wing tip device in the ground configuration when the aircraft is about to start a take-off run, (ii) starting the take-off run, and (iii) allowing the wing tip device to rotate from the ground configuration towards the flight configuration, at least some of that movement being effected as a result of the aerodynamic forces on the wing tip device during take-off.

The method may comprise the step of locking the wing tip device in the flight configuration when the wing tip device reaches that flight configuration.

According to another aspect of the invention, there is provided a method of operating an aircraft as described herein, the method comprising the steps of: (i) having the wing tip device in the flight configuration, (ii) starting the landing procedure, and (iii) allowing the wing tip device to rotate from the flight configuration towards the ground configuration, at least some of that movement being effected as a result of the decreasing aerodynamic forces on the wing tip device during the landing procedure.

The step of allowing the wing tip device to rotate from the flight configuration may comprises the step of unlocking the wing tip device from the flight configuration.

According to another aspect of the invention, there is provided a wing, wing tip device and hinge for use as the wing, wing tip device and hinge as described herein.

It will of course be appreciated that features described in relation to one aspect of the present invention may be incorporated into other aspects of the present invention. For example, the method of the invention may incorporate any of the features described with reference to the apparatus of the invention and vice versa, and features described in relation to the aircraft of the first aspect of the invention may be incorporated into the aircraft of the second aspect of the invention.

DESCRIPTION OF THE DRAWINGS

Embodiments of the present invention will now be described by way of example only with reference to the accompanying schematic drawings of which.

DETAILED DESCRIPTION

Figure 1A:
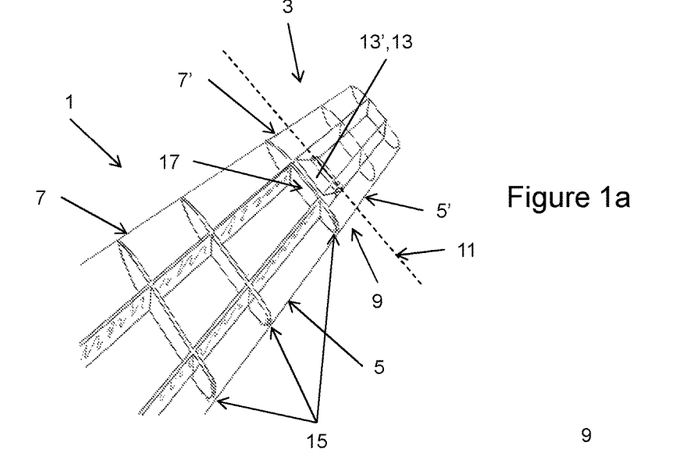
FIG. 1a shows a perspective view of a wing and wing tip device on a passenger aircraft according to a first embodiment of the invention, the wing tip device being shown in the flight configuration.
Figure 1B:
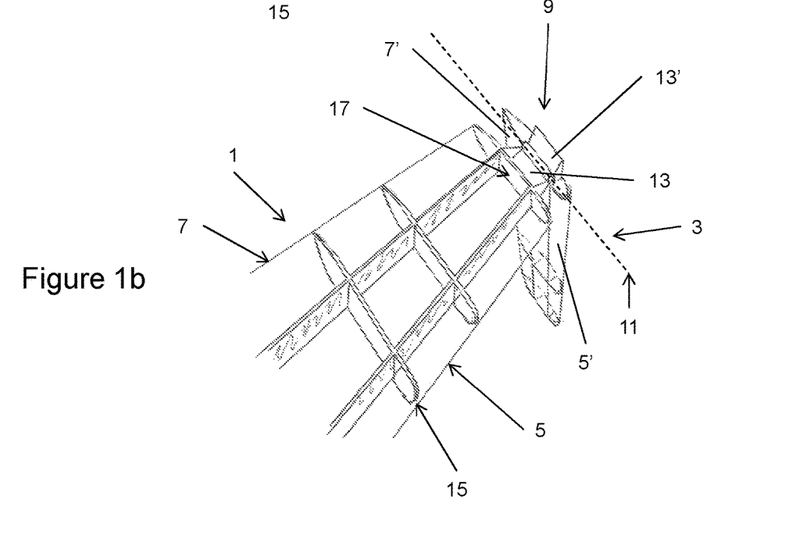
FIG. 1b shows the wing and wing tip device of FIG. 1a but with the wing tip device in a ground configuration.

FIGS. 1a and 1b are perspective views of part of a wing 1 of a passenger aircraft (see FIG. 2) according to a first embodiment of the invention, the wing 1 having a wing tip device 3 at the tip thereof. In FIGS. 1a and 1b, the wing skin has been removed in the drawings to illustrate some of the internal wing structure (described below in more detail).

In the first embodiment, the wing tip device 3 is in the form of a planar wing extension, although the invention is also applicable to other types of wing tip device (such as winglets).

The wing tip device 3 is moveable between a flight configuration (FIG. 1a) and a ground configuration (FIG. 1b). In the flight configuration, the leading and trailing edges 5', 7' of the wing tip device 3 are continuations of the leading and trailing edges 5, 7 of the wing 1. Furthermore, the upper and lower surfaces of the wing tip device 3 device (not shown) are continuations of the upper and lower surfaces of the wing (not shown). Thus, there is a smooth transition from the wing 1 to the wing tip device 3.

The wing tip device 3 is placed in the flight configuration for flight. In the flight configuration, the wing tip device 3 thus increases the span of the aircraft (thereby providing beneficial aerodynamic effects, for example, reducing the component of induced drag and increasing the lift). In principle, it would be desirable to maintain this large span at all times and simply have a large fixed wing. However, the maximum aircraft span is effectively limited by airport operating rules which govern various clearances required when manoeuvring around the airport (such as the span and/or ground clearance required for gate entry and safe taxiway usage). Thus, in the first embodiment of the invention, the wing tip device 3 is moveable to a ground configuration for use when on the ground. In the ground configuration (FIG. 1b) the wing tip device 3 is folded downwardly, from the above-mentioned flight configuration, about a hinge 9 defining a hinge line 11, such that the wing tip device 3 hangs down vertically, and the span of the aircraft is reduced so as to comply with the above-mentioned airport clearances etc.

Changing the span of an aircraft is known per se. For example, in some suggested designs, military aircraft are provided with wings which may be folded upwardly to reduce the span of the aircraft on the ground (compared to when the aircraft is configured for flight). However, a disadvantage with such arrangements is that they tend to require heavy actuators and/or locking mechanisms to deploy the wing and to securely hold it in the flight configuration. The first embodiment seeks to address this problem.

In the first embodiment of the invention, the hinge 9 is arranged to allow the wing tip device 3 to rotate about the hinge line between the flight configuration and the ground configuration, but also to prevent the wing tip device 3 rotating upwardly beyond the flight configuration. More specifically, the wing 1 and the wing tip device 3 comprise respective abutment surfaces 13, 13' at the hinge 9. The abutment surfaces are shaped such that when the wing tip device 3 is in the flight configuration, the surfaces abut one another and block further upwards rotation of the wing tip device 3 (i.e. beyond the flight configuration). Furthermore, since the hinge line 11 is parallel to the wing ribs 15 and the abutment surface 13 on the wing is connected to the outermost wing rib 17, the bending moment generated about the hinge line 11 (during flight) is reacted into the wing rib 17. Such an arrangement negates the need to use heavy locks and/or actuators to hold the wing tip device in place when it is in the flight configuration. This enables smaller actuator/locks to be used thereby saving weight.

Figure 1C:
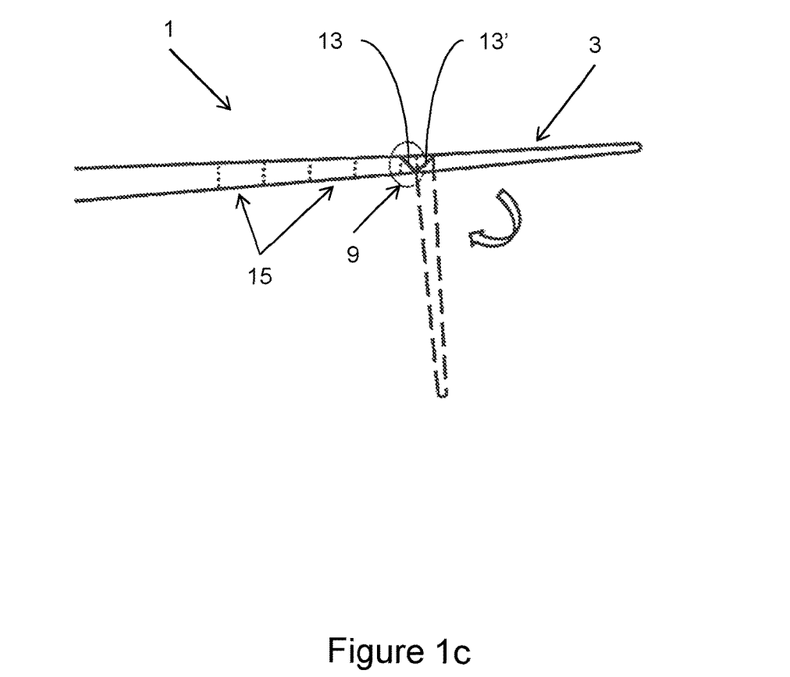
FIG. 1c is a sectional view of the embodiment of FIGS. 1a and 1b, showing the wing tip device in both configurations.

FIG. 1c shows the first embodiment in a spar-wise section. The wing tip device 3 in the flight configuration is shown in solid lines, whereas the device 3 in the ground configuration is shown in dashed-lines.

In the first embodiment, the aircraft comprises a lock (not shown) for locking the wing tip device 3 when it is in the flight configuration. The lock is arranged to prevent rotation of the wing tip device 3 from the flight configuration to the ground configuration and is rated to prevent the rotation of the wing tip device during negative-g flight of up to −2.5 g. As a redundant safety feature, the lock is rated to prevent the rotation of the wing tip device during positive g flight, but only up to 2.5 g. This rating is lower than would otherwise be required if the hinge were not arranged to prevent the over-rotation of the wing tip device, and the lock is therefore correspondingly lighter.

Figure 2:
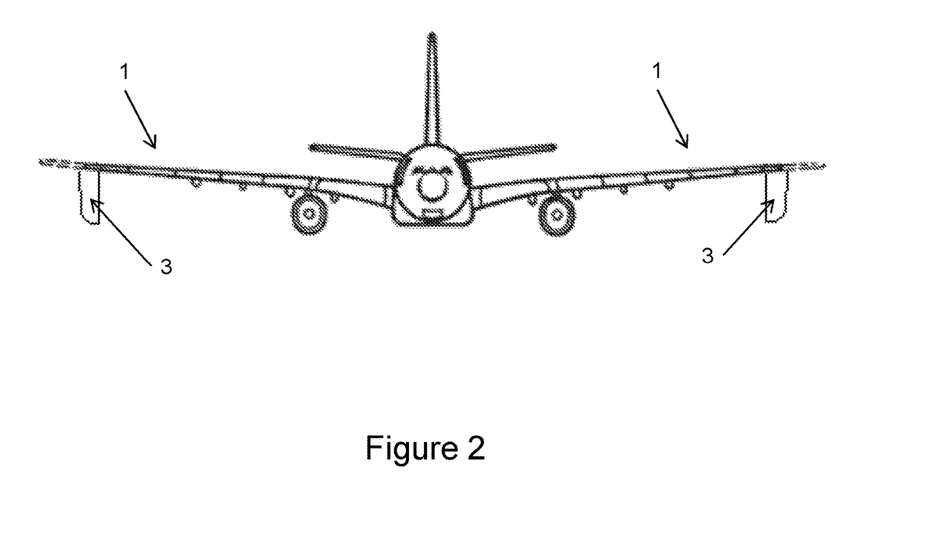
FIG. 2 shows a front view of an aircraft with the wing and wing tip device of FIGS. 1a-c.

As described above, in the first embodiment of the invention, the hinge line 11 is orientated parallel to the wing ribs 15. Since the wing 1 is swept, the hinge line is thus at an angle to the direction of flight (i.e. at an angle to the longitudinal axis of the aircraft). The wing tip device 3 therefore presents a larger frontal area when it is in the ground configuration than when it is in the flight configuration. This is illustrated in FIG. 2 which shows the aircraft with the wing tip devices 3 (at either wing tip) both in the ground configuration. During forwards motion of the aircraft, the pressure drag acting on exposed surfaces of each downwardly extending wing tip device 3, moves the device away from the ground configuration and towards the flight configuration. As the device rotates upwardly these forces continue to urge the device upwardly but the wing tip device 3 also starts to generate its own lift which also contribute to moving the device towards the flight configuration. Such an arrangement has been found to be beneficial because the actuator for moving the tip device (not shown in the first embodiment) can have a relatively low capacity. Specifically, the capacity can be less than that required to move the wing tip device from the ground configuration to the flight configuration in the absence of the aerodynamic forces. The actuator can therefore be relatively small and light.

The method of operating the passenger aircraft of the first embodiment during take-off and landing will now be described: For take-off, the wing tip device 3 is first configured in the ground configuration. The aircraft then commences the take-off run. There is no lock on the wing tip device in this configuration, and the hinge is sufficiently free-moving to allowing the wing tip device to rotate from the ground configuration towards the flight configuration by virtue of the drag acting on the device. As the speed of the aircraft increases and the device rotates upwardly, the drag decreases but the device 3 begins to generate sufficient lift to assist in moving itself to the flight configuration. The actuator is also used to assist in this movement, until the wing tip device reaches the flight configuration. At that point, the lock is engaged to prevent the wing tip device falling back down under negative-g flight conditions.

For landing the process is reversed. Namely the lock is disengaged (for example at the same time the landing gear is deployed). As the angle of attack of the aircraft decreases as the nose is brought down, the lift/drag forces on the wing tip device 3 decreases to the point that gravity overcomes it and the tip returns to the ground configuration. In this scenario, it is not actually necessary to use the actuator at all.

Figure 3:
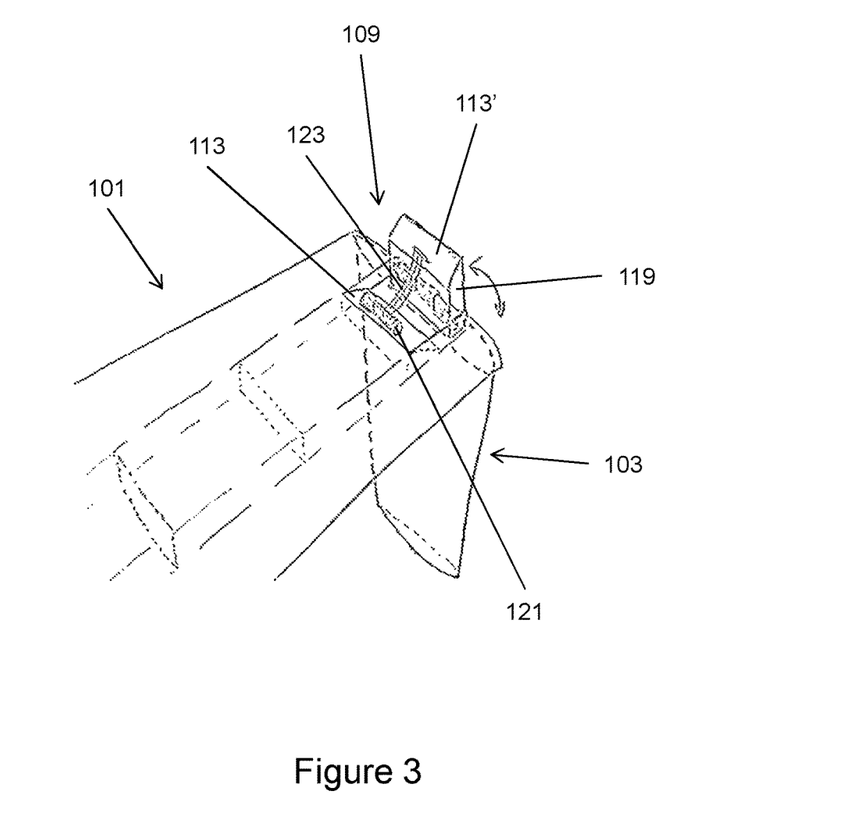
FIG. 3 shows a perspective view of a wing and wing tip device according to a second embodiment of the invention, the wing tip device being shown in the ground configuration.

FIG. 3 shows a wing 101 of a passenger aircraft according to a second embodiment of the invention. Features in the second embodiment of the invention that correspond to similar features in the first embodiment of the invention, are shown with the same reference numerals as in the first embodiment, but with the addition of the prefix '1' (or '10' where appropriate).

The second embodiment is the same as the first embodiment except that the hinge 109 is arranged such that the abutment surface 113' on the wing tip device 103 is located on the end of an arm 119 and the aircraft includes an actuator 121 for actuating the wing tip device from the ground configuration to the flight configuration.

The actuator 121 is in the form of an electric winch, for retracting a tether 123 connected to the arm 119 of the wing tip device 103. By virtue of the tether being located on the arm 119, the winch takes advantage of the relatively large moment arm and can thus be made relatively small. Other actuators are, of course, possible such as planetary or harmonic gear rotary actuators. These may, for example, be located on the hinge line 111.

In another embodiment of the invention (not shown), the aircraft does not comprise any actuator to move the wing tip device. Instead, the device is arranged to move entirely under the effect of the above-described aerodynamic forces. Such an arrangement is especially beneficial because there are relatively low maintenance costs due to the low number of moving parts.

Whilst the present invention has been described and illustrated with reference to particular embodiments, it will be appreciated by those of ordinary skill in the art that the invention lends itself to many different variations not specifically illustrated herein. By way of example the wing tip device need not necessarily be a planar wing extension. Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims. Moreover, it is to be understood that such optional integers or features, whilst of possible benefit in some embodiments of the invention, may not be desirable, and may therefore be absent, in other embodiments.

The invention claimed is:

1. A passenger aircraft comprising a wing, the wing having a wing tip device at the tip thereof, wherein the wing tip device is moveable between:
   i. a flight configuration for use during flight, and
   ii. a ground configuration for use during ground-based operations, in which ground configuration the wing tip device is folded downwardly from the flight configuration such that the span of the aircraft is reduced, and
   wherein the wing tip device is connected to the wing along a hinge defining a hinge line, the hinge being arranged to allow the wing tip device to rotate about the hinge line between the flight configuration and the ground configuration, but to prevent the wing tip device rotating upwardly beyond the flight configuration;
   wherein the hinge line is orientated at an angle to a flight direction such that the wing tip device presents a larger frontal area when in the ground configuration than when in the flight configuration, and such that during forward motion of the aircraft, aerodynamic forces act on the wing tip device to allow the wing tip device to rotate away from the ground configuration and towards the flight configuration under the action of the aerodynamic forces, and wherein the aircraft further comprises an actuator for moving the wing tip device from the ground configuration to the flight configuration, the actuator having a capacity of less than that required for moving the wing tip device in the absence of the aerodynamic forces.

2. The passenger aircraft according to claim 1, wherein during flight, with the wing tip device in the flight configuration, the aerodynamic forces acting on the wing tip device are such that the wing tip device is urged away from rotating back to the ground configuration.

3. The passenger aircraft according to claim 1, wherein the wing and the wing tip device comprise respective abutment surfaces, and the hinge is configured such that in the flight configuration, the abutment surfaces of the wing tip device and the wing abut one another thereby blocking further rotation of the wing tip device upwardly beyond the flight configuration.

4. The passenger aircraft according to claim 3, wherein during flight, with the wing tip device in the flight configuration, a bending moment generated about the hinge line is reacted against the abutment surface of the wing.

5. The passenger aircraft according to claim 1, wherein the aircraft comprises a lock configured to lock the wing tip device when the wing tip device is in the flight configuration, the lock being arranged to prevent rotation of the wing tip device from the flight configuration to the ground configuration.

6. The passenger aircraft according to claim 5 wherein the lock is rated to prevent the rotation of the wing tip device during negative-g flight over a negative-g flight envelope.

7. The passenger aircraft according to claim 5, wherein the lock is arranged to be substantially free from loads during positive-g flight.

8. The passenger aircraft according to claim 1 wherein the wing comprises a multiplicity of wing ribs orientated at an angle to the direction of flight, and the hinge line is orientated parallel to the wing ribs.

9. A method of operating an aircraft, the aircraft comprising a wing, the wing having a wing tip device at the tip thereof, wherein the wing tip device is moveable between:
   i. a flight configuration for use during flight, and
   ii. a ground configuration for use during ground-based operations, in which ground configuration the wing tip device is folded downwardly from the flight configuration such that the span of the aircraft is reduced, and
wherein the wing tip device is connected to the wing along a hinge defining a hinge line, the hinge being arranged to allow the wing tip device to rotate about the hinge line between the flight configuration and the ground configuration, but to prevent the wing tip device rotating upwardly beyond the flight configuration,
such that during forwards motion of the aircraft, and wherein with the wing tip device in the ground configuration, aerodynamic forces acting on the wing tip device during forwards motion of the aircraft are such that the wing tip device is allowed to rotate about the hinge line away from the ground configuration and towards the flight configuration under the action of said forces; and
wherein the aircraft further comprises an actuator for moving the wing tip device from the ground configuration to the flight configuration, the actuator having a capacity of less than that required for moving the wing tip device in the absence of the aerodynamic forces, and wherein the method comprises the steps of:
   i. having the wing tip device in the ground configuration when the aircraft is about to start a take-off run,
   ii. starting the take-off run, and
   iii. allowing the wing tip device to rotate from the ground configuration towards the flight configuration, at least some of that movement being effected as a result of the aerodynamic forces on the wing tip device during take-off.

10. The method according to claim 9 wherein the hinge line is orientated at an angle to the flight direction such that the wing tip device presents a larger frontal area when it is in the ground configuration than when it is in the flight configuration.

11. The method according to claim 9, further comprising the step of locking the wing tip device in the flight configuration when the wing tip device reaches that flight configuration.

12. A method of operating an aircraft, the aircraft comprising a wing, the wing having a wing tip device at the tip thereof, wherein the wing tip device is moveable between:
   i. a flight configuration for use during flight, and
   ii. a ground configuration for use during ground-based operations, in which ground configuration the wing tip device is folded downwardly from the flight configuration such that the span of the aircraft is reduced, and
wherein the wing tip device is connected to the wing along a hinge defining a hinge line, the hinge being arranged to allow the wing tip device to rotate about the hinge line between the flight configuration and the ground configuration, but to prevent the wing tip device rotating upwardly beyond the flight configuration,
such that during forwards motion of and wherein with the wing tip device in the ground configuration, aerodynamic forces acting on the wing tip device during forwards motion of the aircraft are such that the wing tip device is allowed to rotate about the hinge line away from the ground configuration and towards the flight configuration under the action of said forces; and
wherein the aircraft further comprises an actuator for moving the wing tip device from the ground configuration to the flight configuration, the actuator having a capacity of less than that required for moving the wing tip device in the absence of the aerodynamic forces,
wherein the method comprises the steps of:
   i. having the wing tip device in the flight configuration,
   ii. starting the landing procedure,
   iii. allowing the wing tip device to rotate from the flight configuration towards the ground configuration, at least some of that movement being effected as a result of the decreasing aerodynamic forces on the wing tip device during the landing procedure.

13. The method according to claim 12 wherein the hinge line is orientated at an angle to the flight direction such that the wing tip device presents a larger frontal area when it is in the ground configuration than when it is in the flight configuration.

14. The method according to claim 12, wherein the step of allowing the wing tip device to rotate from the flight configuration comprises the step of unlocking the wing tip device from the flight configuration.

15. A passenger aircraft comprising:
   a wing including a tip, and
   a wing tip device connected to the tip of the wing, wherein the wing tip device is moveable between a flight configuration and a ground configuration, wherein the wing tip device, while in the ground configuration, is folded downwardly from the flight configuration, wherein the wing tip device is connected to the wing by a hinge and along a hinge line extending through the hinge, wherein the wing tip device rotates about the hinge line between the flight configuration and the ground configuration, wherein the wing tip device presents a larger frontal area while in the ground configuration than while in the flight configuration, and wherein during forward flight of the aircraft, aerodynamic forces bias the wing tip device towards the flight configuration, and wherein the aircraft further comprises an actuator for moving the wing tip device from the ground configuration to the flight configuration, the actuator having a capacity of less than that required for moving the wing tip device in the absence of the aerodynamic forces.

16. The passenger aircraft of claim 15 further comprising a first abutment surface fixed to the tip of the wing and second abutment surface fixed to the wing tip device, wherein the first abutment surface abuts the second abutment surface while the wing tip device is in the flight configuration, and the first abutment surface is separated from the second abutment surface while the wing tip device is in the ground configuration.

17. The passenger aircraft of claim 16 wherein the second abutment surface is an end of an arm extending from a root end of the wing tip device, and the passenger aircraft further comprises a tether attached to a point on the arm and to the wing, and an actuator configured to retract or deploy the tether to pivot the wing tip device about the hinge, wherein a bending moment is formed between the point on the arm and the hinge.

18. The passenger aircraft of claim 17 wherein the hinge line extends in a chordwise direction of the wing.

* * * * *